(12) United States Patent
White

(10) Patent No.: US 10,157,212 B2
(45) Date of Patent: Dec. 18, 2018

(54) METHOD AND APPARATUS TO CONSTRUCT AN ONTOLOGY WITH DERIVED CHARACTERISTICS FOR ONLINE SOCIAL NETWORKS

(71) Applicant: Rsignia, Inc., Rockville, MD (US)

(72) Inventor: Joshua White, Ilion, NY (US)

(73) Assignee: Rsignia, Inc., Rockville, MD (US)

( * ) Notice: Subject to any disclaimer, the term of this patent is extended or adjusted under 35 U.S.C. 154(b) by 481 days.

(21) Appl. No.: 14/742,412

(22) Filed: Jun. 17, 2015

(65) Prior Publication Data

US 2016/0371346 A1 Dec. 22, 2016

(51) Int. Cl.
*G06F 17/30* (2006.01)

(52) U.S. Cl.
CPC .. *G06F 17/30569* (2013.01); *G06F 17/30734* (2013.01); *G06F 17/30958* (2013.01)

(58) Field of Classification Search
CPC ......... G06F 17/30569; G06F 17/30734; G06F 17/30958
See application file for complete search history.

(56) References Cited

U.S. PATENT DOCUMENTS

| | | | | |
|---|---|---|---|---|
| 7,779,004 | B1 * | 8/2010 | Walsh | G06F 17/30867 707/734 |
| 8,620,964 | B2 * | 12/2013 | Tsatsou | G06F 17/30734 707/798 |
| 9,477,752 | B1 * | 10/2016 | Romano | G06F 17/30734 |
| 2006/0260624 | A1 * | 11/2006 | Schur | A61B 5/16 128/898 |
| 2008/0033776 | A1 * | 2/2008 | Marchese | G06Q 20/10 705/7.33 |
| 2008/0243809 | A1 * | 10/2008 | Ranganathan | G06F 17/30734 |
| 2008/0301177 | A1 * | 12/2008 | Doherty | G06F 17/30864 |
| 2009/0192809 | A1 * | 7/2009 | Chakraborty | G06Q 10/00 705/348 |
| 2011/0225293 | A1 * | 9/2011 | Rathod | G06F 17/30867 709/224 |
| 2012/0173493 | A1 * | 7/2012 | Sabbouh | G06F 17/30734 707/687 |

(Continued)

*Primary Examiner* — Jared M Bibbee
(74) *Attorney, Agent, or Firm* — Capitol City TechLaw, PLLC; Jasbir Singh

(57) ABSTRACT

A machine implemented method, a processing device, and one or more non-transient machine-readable media are provided for analyzing multiple online social networks. The processing device may construct a master actor ontology in a light weight data-interchange format based on information received from the multiple online social networks. The constructed master actor ontology may include available characteristics identified from the received information, multiple derived graph characteristics, user behavior classifications, and an introversion/extroversion indicator for each of multiple actors. At least one logical expression representing at least one correlation of interest with respect to a graph or a subgraph of the master actor ontology may be input and automatically converted to a resource description framework query format. At least one query may be performed over the master actor ontology based on the converted at least one logical expression. At least one result of the at least one query may be provided.

24 Claims, 13 Drawing Sheets

(56) References Cited

U.S. PATENT DOCUMENTS

| | | | |
|---|---|---|---|
| 2012/0324004 A1* | 12/2012 | Le | G06Q 10/00 |
| | | | 709/204 |
| 2013/0007150 A1* | 1/2013 | Hertz | H04L 51/32 |
| | | | 709/206 |
| 2013/0013667 A1* | 1/2013 | Serena | G06Q 10/10 |
| | | | 709/203 |
| 2013/0204872 A1* | 8/2013 | Runchey | G06F 17/30734 |
| | | | 707/736 |
| 2013/0290226 A1* | 10/2013 | Dokken | G06N 5/02 |
| | | | 706/12 |
| 2014/0122383 A1* | 5/2014 | Shen | A63F 13/12 |
| | | | 706/12 |
| 2014/0278706 A1* | 9/2014 | Leidner | G06Q 10/06315 |
| | | | 705/7.25 |
| 2015/0170295 A1* | 6/2015 | Shen | G06Q 50/01 |
| | | | 705/319 |
| 2015/0242815 A1* | 8/2015 | Velasco | H04W 4/21 |
| | | | 705/321 |
| 2016/0170956 A1* | 6/2016 | Allen | G06F 17/27 |
| | | | 704/9 |
| 2016/0198047 A1* | 7/2016 | McCormack | H04M 3/5175 |
| | | | 379/265.09 |
| 2016/0306332 A1* | 10/2016 | Hill | G05B 19/0426 |
| 2016/0364379 A1* | 12/2016 | Assa | G06F 17/30 |
| 2017/0104791 A1* | 4/2017 | Cooper | H04L 63/20 |

\* cited by examiner

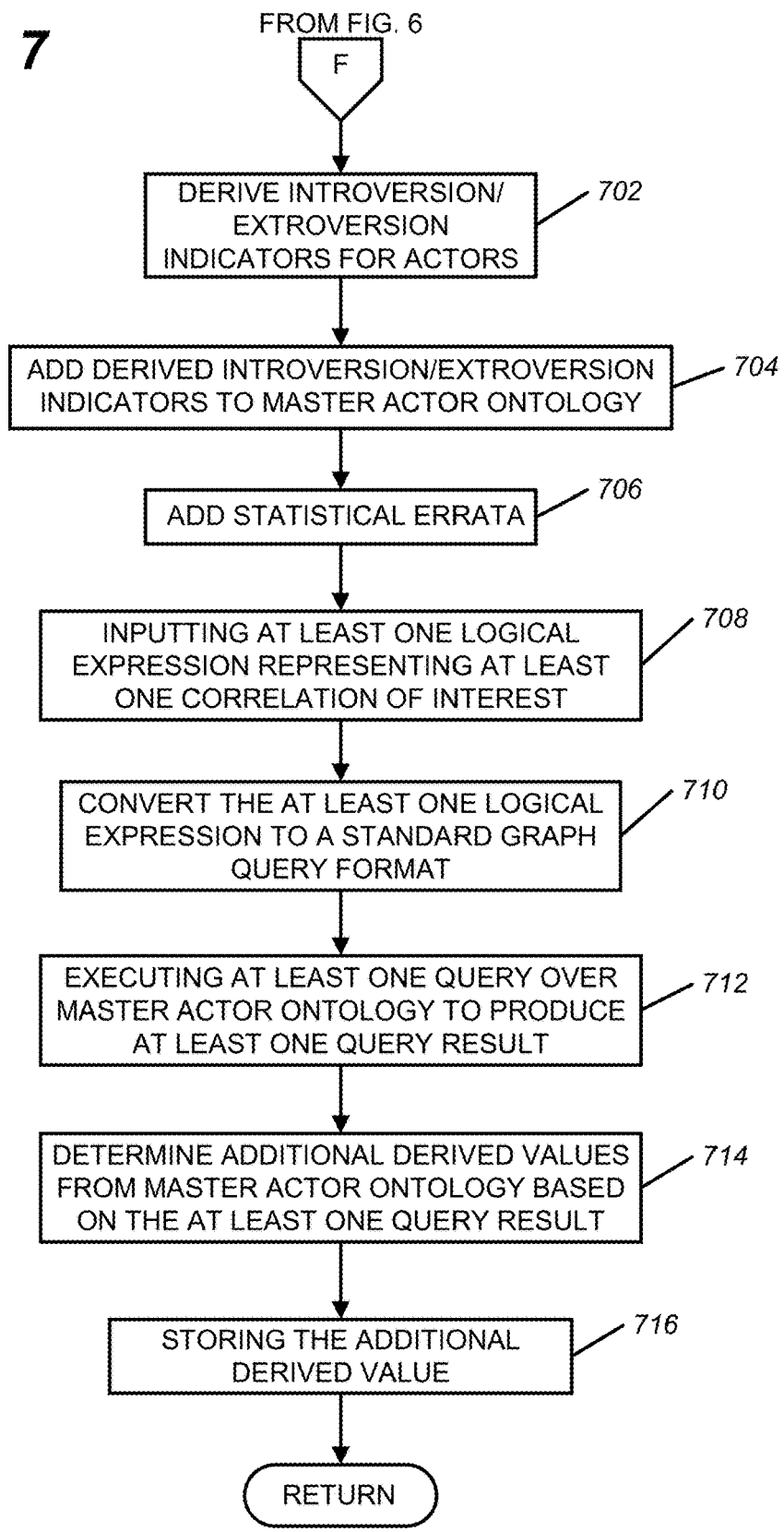

{"favorited": false, "in_reply_to_user_id": null, "contributors": null, "truncated": false, "text": "Sooo I Stilll Haven't Seen The Vow And I Tell My Mom To Be My Lovelly Date And Go See It With Me And She Said Go With Your Friend -__-", "created_at": "Mon Feb 20 00:00:00 +0000 2012", "retweeted": false, "in_reply_to_status_id": null, "coordinates": null, in_reply_to_user_id_str":null, "entities": {"user_mentions": [], "hashtags": [], "urls": []}, "in_reply_to_status_id_str": null, "id_str": "171383564821217280", "in_reply_to_screen_name": null, "user": {"follow_request_sent": null, "profile_use_background_image": true, "contributors_enabled": false, "id": 413653782, "verified": false, "profile_image_url_https": "https://si0.twimg.com/profile_images/1791757329/image_normal.jpg", "profile_sidebar_fill_color": "DDEEF6", "is_translator": false, "profile_text_color": "ff4603", "followers_count": 23, "profile_sidebar_border_color": "C0DEED", "location": "New Yorrrrrk", "default_profile_image": false, "id_str": "413653782", "utc_offset": -25200, "statuses_count": 627, "description": "#Follow Me & I'll Follow Back (:", "friends_count": 44, "profile_link_color": "0084B4", "profile_image_url": "http://a2.twimg.com/profile_images/1791757329/image_normal.jpg", "notifications": null, "show_all_inline_media": false, "geo_enabled": true, "profile_background_color": "ffffff", "profile_background_image_url": "http://a1.twimg.com/profile_background_images/398589637/Honeeey____.jpg", "screen_name": "JaayDizzle", "lang": "en", "profile_background_tile": true, "favourites_count": 24, "name": "Julianneeeeee \ue314", "url": null, "created_at": "Wed Nov 16 03:37:11 +0000 2011", "profile_background_image_url_https": "https://si0.twimg.com/profile_background_images/398589637/Honeeey____.jpg", "time_zone": "Mountain Time (US & Canada)", "protected": false, "default_profile": false, "following": null, "listed_count": 0}, "place": null, "retweet_count": 0, "geo": null, "id": 171383564821217280, "source": "<a href=\"http://mobile.twitter.com\" rel=\"nofollow\">Mobile Web</a>"}

```
{
  "favorited": false,
  "in_reply_to_user_id": null,
  "contributors": null,
  "truncated": false,
  "text": "Sooo I Stilll Haven't Seen The Vow And I Tell My Mom To Be My Lovelly Date And Go See It With Me And She Said Go With Your Friend -__-",
  "created_at": "Mon Feb 20 00:00:00 +0000 2012",
  "retweeted": false,
  "in_reply_to_status_id": null,
  "coordinates": null,
  "in_reply_to_user_id_str": null,
  "entities": {
    "user_mentions": [],
    "hashtags": [],
    "urls": []
  },
  "in_reply_to_status_id_str": null,
  "id_str": "171383564821217280",
  "in_reply_to_screen_name": null,
  "user": {
    "follow_request_sent": null,
    "profile_use_background_image": true,
    "contributors_enabled": false,
    "id": 413653782,
    "verified": false,
    "profile_image_url_https": "https://si0.twimg.com/profile_images/1791757329/image_normal.jpg",
    "profile_sidebar_fill_color": "DDEEF6",
    "is_translator": false,
    "profile_text_color": "ff4603",
    "followers_count": 23,
    "profile_sidebar_border_color": "C0DEED",
    "location": "New Yorrrrrk",
    "default_profile_image": false,
    "id_str": "413653782",
    "utc_offset": -25200,
    "statuses_count": 627,
    "description": "#Follow Me & I'll Follow Back (:",
    "friends_count": 44,
    "profile_link_color": "0084B4",
    "profile_image_url": "http://a2.twimg.com/profile_images/1791757329/image_normal.jpg",
    "notifications": null,
    "show_all_inline_media": false,
    "geo_enabled": true,
    "profile_background_color": "ffffff",
    "profile_background_image_url": "http://a1.twimg.com/profile_background_images/398589637/Honeeey___.jpg",
    "screen_name": "JaayDizzle",
    "lang": "en",
    "profile_background_tile": true,
    "favourites_count": 24,
    "name": "Julianneeeeee ",
    "url": null,
    "created_at": "Wed Nov 16 03:37:11 +0000 2011",
```

```
"profile_background_image_url_https": "https://si0.twimg.com/profile_background_images/398589637/
Honeeey___.jpg",
    "time_zone": "Mountain Time (US & Canada)",
    "protected": false,
    "default_profile": false,
    "following": null,
    "listed_count": 0
},
"place": null,
"retweet_count": 0,
"geo": null,
"id": 1713835648212172180,
"source": "<a href=\"http://mobile.twitter.com\" rel=\"nofollow\">Mobile Web</a>"
}
```

FIG. 10

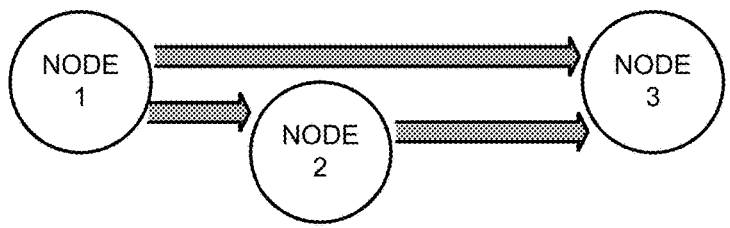

FIG. 13

| | | |
|---|---|---|
| profile link color | In reply to status id | In reply to user id |
| Coordinates | text | place |
| In reply to screen name | In reply to status id str | profile background color |
| Geo | entities | contributors enabled |
| profile background title | profile image url | retweet count |
| default profile | lang | created at |
| default profile image | sidebar border color | favorites count |
| description | use background image | following |
| follow request sent | sidebar fill color | id translator |
| followers count | screen name | location |
| friends count | profile text color | truncated |
| geo enabled | show all inline media | retweeted |
| profile image url https | url | Contributors |
| listed count | utc offset | protected |
| profile background image url | Created at | time zone |
| notifications | Id | statuses count |
| background image url https | Favorited | verified |
| name | Id str | |

*FIG. 11*

```
<rdf:RDF
    xmlns:rdf="http://www.w3.org/1999/02/22-rdf-syntax-ns#"
    xmlns:j.0="urn:" >
  <rdf:Description rdf:about="urn:communication108">
    <j.0:hour rdf:datatype="http://www.w3.org/2001/XMLSchema#long">2012022006</j.0:hour>
    <j.0:target rdf:resource="urn:maven1"/>
    <j.0:source rdf:resource="urn:questioner1"/>
    <j.0:message>Question One for Maven</j.0:message>
  </rdf:Description>
    <rdf:Description rdf:about="urn:communication109">
    <j.0:hour rdf:datatype="http://www.w3.org/2001/XMLSchema#long">2012021905</j.0:hour>
    <j.0:target rdf:resource="urn:maven1"/>
    <j.0:source rdf:resource="urn:informationer1"/>
    <j.0:message>Answer or Information for Maven Use</j.0:message>
  </rdf:Description>
    <rdf:Description rdf:about="urn:communication110">
    <j.0:hour rdf:datatype="http://www.w3.org/2001/XMLSchema#long">2012022007</j.0:hour>
    <j.0:target rdf:resource="urn:questioner1"/>
    <j.0:source rdf:resource="urn:maven1"/>
    <j.0:message>Answer or Information for Maven Use</j.0:message>
  </rdf:Description>
    <rdf:Description rdf:about="urn:communication111">
    <j.0:hour rdf:datatype="http://www.w3.org/2001/XMLSchema#long">2012022008</j.0:hour>
    <j.0:target rdf:resource="urn:other1"/>
    <j.0:source rdf:resource="urn:maven1"/>
    <j.0:message>Answer or Information for Maven Use</j.0:message>
  </rdf:Description>
```

Table: User Behavior Classification Based on System Threat Type

| Role | Motivation | Threat Type | Potential Attack Type | Description |
|---|---|---|---|---|
| Insider | Honor | Disenfranchised Employee | Information Leakage, Unauthorized Access, Organizational Sabotage | Insider who was loyal to an organization, but now has a strong opposition to the organization's beliefs, principals, or practices; unlikely to stop until caught |
| Insider | Fame or Pride | Narcissist | Organizational Sabotage | Individual who believes he or she is smarter than an organization; likely to engage in increasingly risky behavior until caught (does not believe anyone is smart enough to catch him/her) |
| Insider | None | Careless Insider | Unauthorized Access | Insider without malicious intent; provides inadvertent openings to attackers |
| Outsider | Greed | Corporate Spy | Information Leakage, Organizational Sabotage | Outsider interested in corporate trade secrets and a competitive edge; maybe mastermind or subservient to higher authority; likely to be cautious and abort plan if discovery is imminent |
| Outsider | Fame or Pride | Social Engineer | Information Leakage, Unauthorized Access, Organizational Sabotage | Outsider that manipulates non-malicious insiders into providing access to sensitive materials or facilities; may be narcissistic or funded by an enemy organization; highly adaptable; likely to abort plan if discovery is imminent |
| Outsider | Fame or Pride | Hacker | Information Leakage, Unauthorized Access | Infiltration may be purely for sport or fame; highly skilled; likely to engage in increasingly risky behavior until caught or threat of discovery is imminent (may believe that organization is not smart enough to catch him or her) |
| Other | Greed, Honor, Fame, or Pride | Potential Insider | n/a | Easily manipulated insider; may be turned into "Insider for Hire", "Disenfranchised Employee", or "Narcissist" under certain circumstances |
| Other | Fear | Risky Insider | n/a | Non-malicious insider whose lifestyle makes him or her a target for a malicious outsider; may be become a "Distressed Insider" |

| PERSON  | KNOWS   | KNOWS   | KNOWS | KNOWS |
|---------|---------|---------|-------|-------|
| JOSH    | NANCY   | DARRELL | ROB   | MIKE  |
| ROB     | NANCY   | DARRELL | JOSH  |       |
| NANCY   | DARRELL | MIKE    | ROB   | JOSH  |
| DARRELL | MIKE    | ROB     | NANCY | JOSH  |

FIG. 15

| PERSON  | JOSH | ROB | NANCY | DARRELL | MIKE |
|---------|------|-----|-------|---------|------|
| JOSH    | 1    | 1   | 1     | 1       | 1    |
| ROB     | 1    | 1   | 1     | 1       | 0    |
| NANCY   | 1    | 1   | 1     | 1       | 1    |
| DARRELL | 1    | 1   | 1     | 1       | 1    |
| MIKE    | 1    | 1   | 1     | 1       | 1    |

FIG. 16

METHOD AND APPARATUS TO CONSTRUCT AN ONTOLOGY WITH DERIVED CHARACTERISTICS FOR ONLINE SOCIAL NETWORKS

FIELD OF THE INVENTION

The invention relates to an apparatus and a method for analyzing online social networks. In particular, an apparatus and method are provided for receiving and analyzing information from multiple online social networks and creating an ontology for further analysis.

BACKGROUND

"Friend Of A Friend" (FOAF) is a well-known ontology for describing direct relationships between individuals in a social network. FOAF works well for creating custom profiles and sharing or interlinking them. A Resource Description Framework (RDF) query language such as SPARQL, which is specific to a storage system used by FOAF, provides a rich query language for querying databases of FOAF data.

However, FOAF has several shortcomings. Queries must be made using an RDF query language, SPARQL, which is specific to a format used by a storage system of FOAF. In addition, FOAF is static, That is, a result of a query cannot be used to define new categories of the FOAF ontology.

Existing social network ontologies are focused on graph placement. None of the existing social network ontologies use psychological or sociological factors as primary descriptors, which are augmented with graph information.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A machine-implemented method is provided for analyzing multiple online social networks. Information regarding the multiple online social networks may be received. The information may include messages, user identifiers, and relationship data regarding actors of multiple online social networks. The received information may be analyzed by identifying available characteristics as defined by network schemas of multiple online social networks, adding the identified available characteristics to a master actor ontology, determining multiple derived graph characteristics, adding the multiple derived graph characteristics to the master actor ontology, determining and adding user behavior classifications to the master actor ontology, determining a derived introversion/extroversion indicator for the actors in the master actor ontology, and adding the derived introversion/extroversion indicator to the master actor ontology. The method further includes inputting at least one logical expression, which represents at least one correlation of interest regarding the master actor ontology converting the at least one logical expression into at least one query in a standard graph query format, executing at least one query over the master ontology to produce at least one query result, determining additional derived values from the master actor ontology based, at least partially, on the at least one query result, and storing the additional derived values from the master actor ontology. The method may be performed either by a standalone processing device or multiple processing devices processing respective portions of the master actor ontology.

In another embodiment, multiple processing devices for analyzing multiple online social networks may be provided. Each of the processing devices may include at least one processing unit, a memory, a communication unit for communicating with at least one other processing device of the multiple processing devices, and a communication bus for permitting the at least one processing unit to communicate with the memory and the communication unit. The memory of each of the multiple processing devices may have stored therein instructions, which when executed by each of the at least one processing unit causes the multiple processing devices to collectively perform a method. The method may include constructing a master actor ontology based on information received from the multiple online social networks, wherein the constructed master actor ontology includes available characteristics identified from the received information, derived graph characteristics, user behavior classifications, and an introversion/extroversion indicator for each of the multiple actors. The method further includes inputting at least one logical expression representing at least one correlation of interest with respect to a graph or a sub graph of the master actor ontology, automatically converting the at least one logical expression to a resource description framework query format, performing at least one query based on the converted at least one logical expression, and providing at least one result of the performed at least one query.

In a third embodiment, at least one non-transient machine-readable medium having instructions stored therein is provided. When the instructions are executed by at least one processor of at least one processing device, a method is performed. The method includes constructing a master actor ontology in a resource description framework format based on information received from multiple online social networks, wherein the constructed master actor ontology includes available characteristics identified from the received information, multiple derived graph characteristics, user behavior classifications, and an introversion/extroversion indicator for each of the multiple actors, inputting at least one logical expression representing at least one correlation of interest regarding a graph or a subgraph of the master actor ontology, automatically converting the at least one logical expression to a resource description framework query format, performing at least one query over the master actor ontology based on the converted at least one logical expression, and providing at least one result of the performed at least one query.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 6-7 are flowcharts which illustrate exemplary processing that may be performed in some embodiments.

FIG. 8 shows an example of unformatted received information, which may be received from an online social network in some embodiments.

FIGS. 9-10 shows the received information of FIG. 8 in a formatted form.

FIG. 11 is a listing of exemplary identifiable characteristics which may be included in information received from online social networks.

FIG. 12 shows an example of a framework for describing resources on the web. The illustrated framework represents many users of an online social network communicating with other users.

FIG. 13 shows an example of communications among three nodes in order to explain how some graph characteristics may be derived.

FIG. 14 provides an exemplary table of user behavior classifications based on a system threat type.

FIGS. 15-16 are tables which are used to explain how relationship information may be stored.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, each of a number of online social networks may be queried for information including messages, user identifiers and relationship data regarding people, or actors, who use the online social networks. The online social networks may provide the information in a light weight data-interchange format such as, for example, JavaScript Object Notation (JSON). The received information may be converted to a framework for describing resources on the web such as, for example, Resource Description Framework (RDF) and may be analyzed to identify available characteristics. The identified characteristics may then be added to a master actor ontology. A number of graph characteristics may be determined including, but not limited to, centrality, connectivity, in-degree, and out-degree, which may be added to the master actor ontology. A number of user behavior classifications may be determined and added to the master actor. Introversion/extroversion indicators for the actors also may be determined and added to the master actor ontology.

A logical expression, representing at least one correlation of interest with respect to the master actor ontology, may be provided as input in various embodiments. The logical expression may be converted into a standard graph query format. In some embodiments, the standard graph query format may be an RDF query language format such as, for example, SPARQL. At least one query, in the standard graph query format, may then be executed over the master actor ontology to produce at least one query result. Additional derived values may be determined from the master actor ontology based, at least in part, on the at least one query result. The additional derived values from the master actor ontology may then be stored in the master actor ontology.

Exemplary Processing Device

Figure 1:
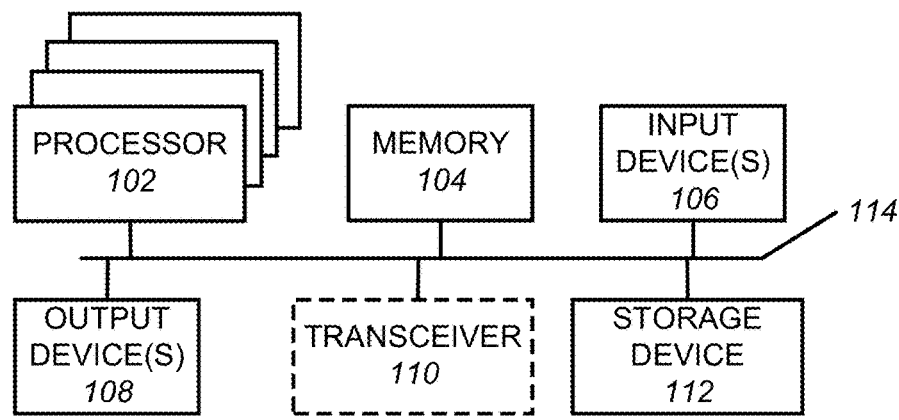
FIG. 1 is a functional block diagram of at least a portion of an exemplary processing device, which may be used to implement various embodiments.

FIG. 1 illustrates a functional block diagram of at least a portion of an exemplary processing device 100 which may be used to implement embodiments of the invention. Processing device 100 may include one or more processors 102, a memory 104, one or more input devices 106, one or more output devices 108, a transceiver 110, a storage device 112, and a communication bus 114. One or more processors 102 may communicate with memory 104, one or more input devices 106, one or more output devices 108, transceiver 110, and storage device 112 via communication bus 114.

One or more processors 102 may include at least one conventional processor or microprocessor that interprets and executes instructions. Memory 104 may include a random access memory (RAM) or another type of dynamic storage device that stores information and instructions for execution by one or more processors 102 and a read only memory (ROM) or another type of static storage device that stores static information and instructions for one or more processors 102. The RAM may also store temporary variables or other intermediate information used during execution of instructions by one or more processors 102.

One or more input devices 106 may include one or more conventional mechanisms that permit a user to input information to one or more processors 102, such as, for example, a keyboard, a touchscreen, a microphone, or other input device. One or more output devices 108 may include a speaker, a display screen, a printer or other output device for providing output to the user.

Transceiver 110 may include any transceiver-like mechanism that enables processing device 102 to communicate with other devices via a wired network connection or a wireless network connection.

Storage device 112 may be a non-transient storage device including, but not limited to, a magnetic medium, an optical medium, a flash storage device, or other non-transient medium.

Processing device 102 may perform such functions in response to one or more processors 102 executing sequences of instructions contained in a non-transient machine-readable storage medium, such as, for example, ROM 140, RAM 130, magnetic medium, optical medium, flash storage device, or other non-transient machine-readable storage medium capable of storing instructions and data with some degree of permanence.

Exemplary Operating Environment

Figure 2:
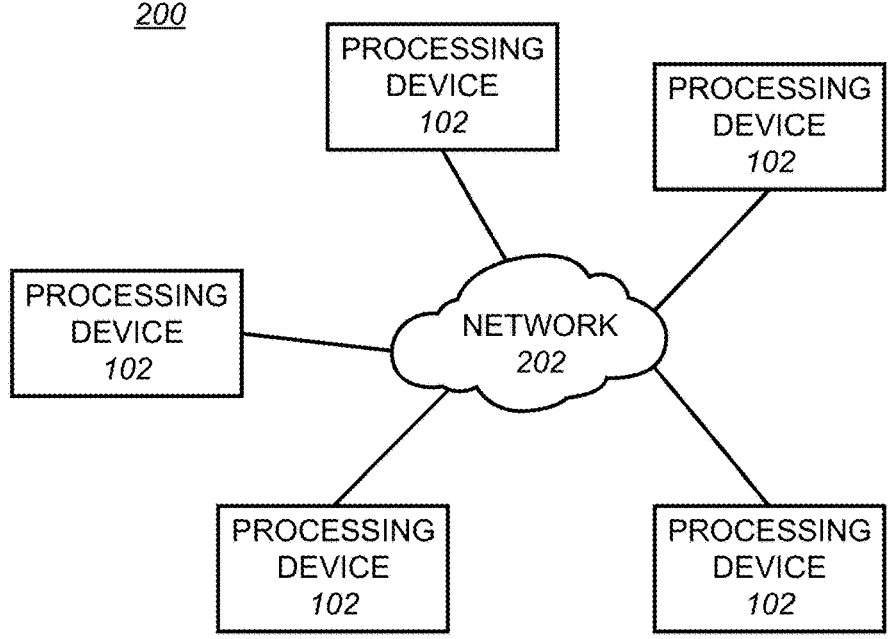
FIG. 2 shows an exemplary operating environment in which embodiments may operate.

FIG. 2 shows an exemplary operating environment 200 having multiple processing devices 102 communicating with each other via a network 202. Network 202 may include only one network or a number of networks including, but not limited to, the Internet. In operating environment 200, processing devices 102 perform distributed processing. At least one processing device of processing device 102 distributes respective portions of a processing task to be performed to multiple processing devices 102. Each multiple processing device 102 may perform its respective portion of the processing task and may report a respective result to the at least one processing device.

In some embodiments, a standalone processing device 102 may perform all processing associated with embodiments of the invention. In these embodiments, the standalone processing device 12 may not include transceiver 110 because communication with other processing devices 102 is not performed.

Exemplary Master Actor Ontology

An ontology defines a set of representational primitives with which to model a domain of knowledge. Typically, the representational primitives are classes (or sets), attributes (or properties), and relationships (or relations among class members). In the context of database systems, an ontology can employed to model knowledge about individuals, their attributes, and their relationships to other individuals.

Figure 3:
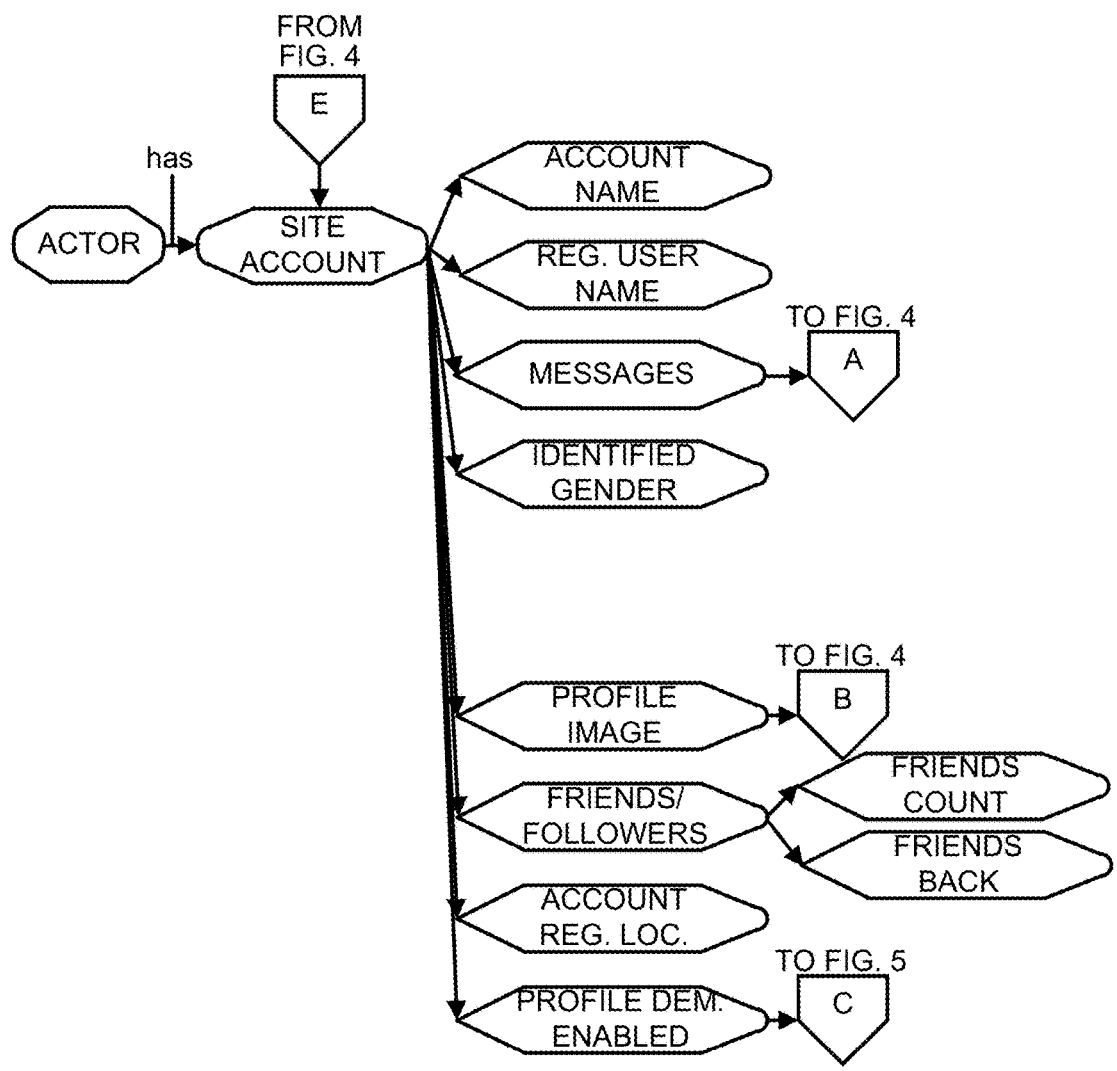
FIGS. 3-5 illustrate an exemplary user subset of a master actor ontology.
Figure 4:
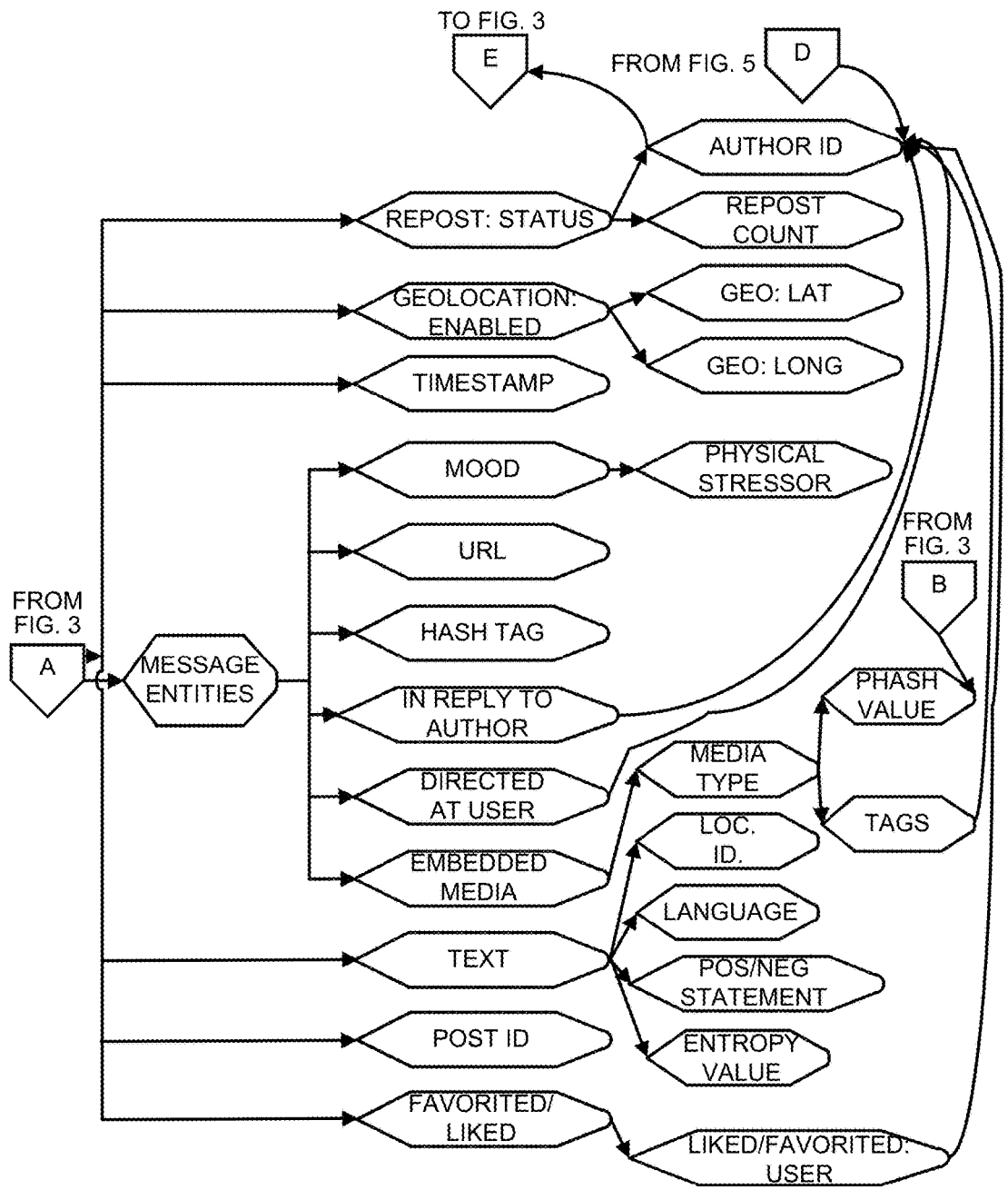
Figure 5:
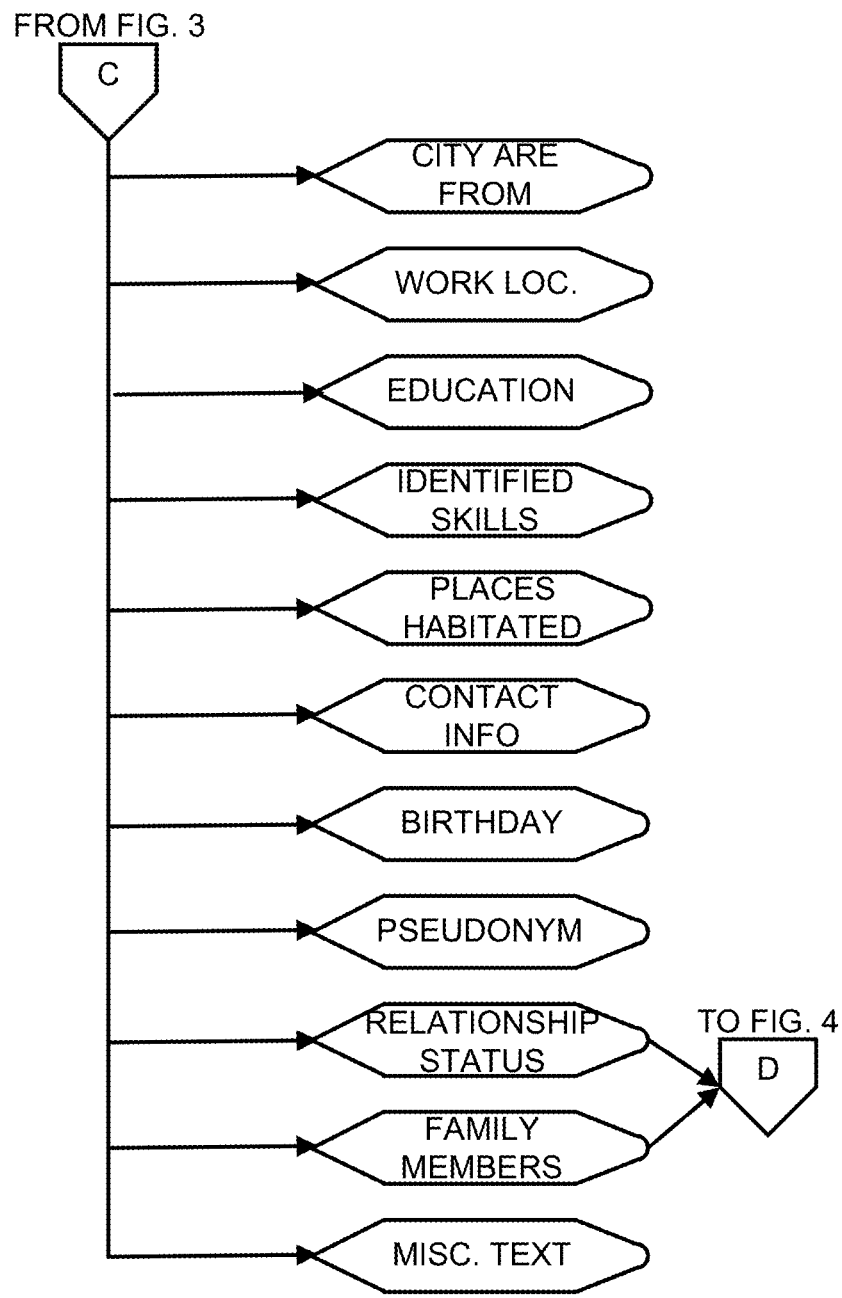

FIGS. 3-5 show an exemplary user subset of a master actor ontology which may be used in various embodiments. With reference to FIG. 3, an Actor has a relation with a Site Account. In this example, the relation is "has". Site Account has a relation with each of Account Name, Registered User Name, Messages, Identified Gender, Profile Image, Friends/Followers, Account Registered Location and Profile Demographics Enabled. Friends/Followers has a relation with Friends Count and Friends Back.

"Messages" has a relation with each of Message Entities (FIG. 4), Repost: Status, Geolocation: Enabled, Timestamp, Text, Post ID and Favorited/Liked. Repost: Status has a relation with Author ID and Repost Count. Geolocation: Enabled is related to each of Geo: Lat and Geo: Long. Text is related to each of Location Identifier, Positive/Negative Statement and Entropy Value. Favorited/Liked is related to Like/Favorited: User. Author ID is related to Site Account (FIG. 3). Message Entities is related to each of Mood, URL, Hash Tag, In Reply To Author, Directed At User and Embedded Media. Mood is related to Physical/Stressor. In Reply to Author is related to Author/ID. Directed At User is related to Author ID. Embedded Media is related to Media Type, which is further related to each of Phash Value and Tags. Tags is further related to Author ID.

Profile Image of FIG. 3 is related to Phash Value of FIG. 4. Profile Demographics Enabled of FIG. 3 is related to each of City Are From, Work Location, Education, Identified Skills, Places Habitated, Contact Information, Birthday, Pseudonym, Relationship Status, Family Members and Miscellaneous Text. Each of Relationship Status and Family Members are related to Author ID (FIG. 4).

Exemplary Processing

Figure 6:
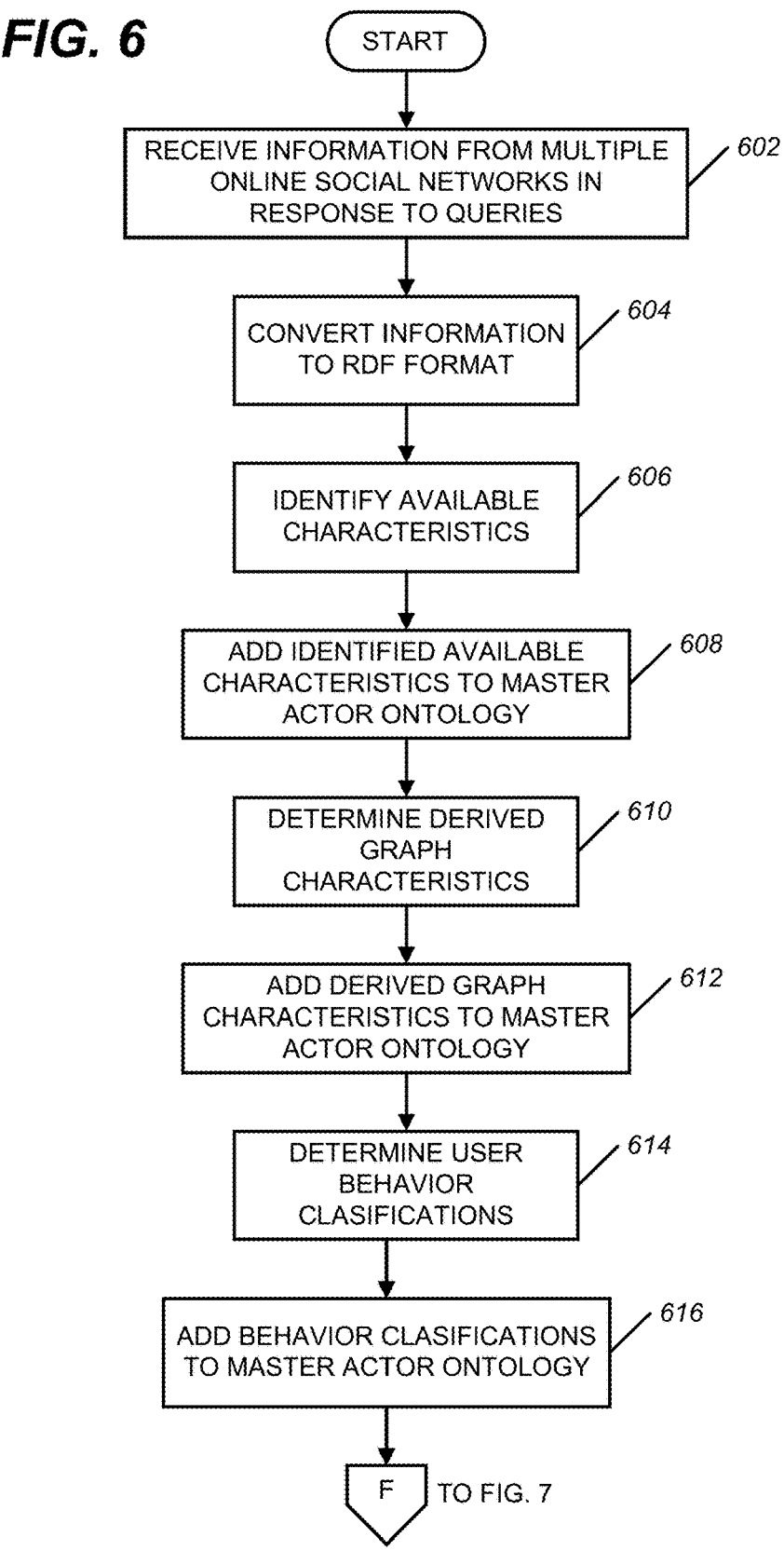

FIGS. 6-7 are flowcharts which illustrate exemplary processing in some embodiments. The processing may begin with at least one processing device receiving information from multiple online social networks in response to queries (act 602). The queries may include, but not be limited to, a search query initiated via an application program interface (API). The received information may be in a light weight data-interchange format such as, for example, JSON.

FIG. 8 illustrates an example of the received information in an unformatted form. FIGS. 9-10 show the received information of FIG. 8 in a formatted form.

With reference to FIGS. 9-10, JSON data is made up of name/value pairs. A name/value pair is made up of a field name (in double quotes) followed by a colon and a value. JSON names are in double quotes. JSON values can be an integer or floating-point number, a string (in double quotes), a Boolean, an array (in square brackets), an object (in curly braces), and a null.

Identifiable characteristics in the JSON data of FIGS. 9-10 are shown in FIG. 11. For example, "profile_link_color" has a value of "0084B4", "Coordinates" has a value of null, "geo_enabled" has a value of true, etc.

Returning to FIG. 6, the information in the light weight data interchange format may be converted, by the at least one processing device, to RDF format (act 604). Methods for converting JSON to RDF format are well known to those of ordinary skill in the relevant fields.

RDF is a framework for describing resources on the web. RDF is written in eXtensible Markup Language (XML). It is designed to be read and understood by computers and is not designed for display to people.

FIG. 12 shows an example of RDF which represents many users of an online social network communicating with other users. "<rdf:RDF" is the root element of RDF documents. "xmlns:rdf" specifies that elements with an rdf prefix are from a namespace http://www.w3.org/1999/02/22-rdf-syntax-ns#. "xmlns:j.0=urn:" specifies that elements with a j.0 prefix are from a namespace "urn:". "<rdf:Description>" includes a description of a resource identified by a "rdf: about" attribute ("urn: communication108"). <j.0:hour> specifies hour as a property within the j.0 namespace having a data type defined in a schema "http://www.w3.org/2001/XMLSchema#long" with a value of 20120222006. <target> is defined in the j.0 namespace as a resource "urn:maven1" in the RDF namespace. <source> is defined in the j.0 namespace as a resource "urn:questioner1" in the RDF namespace. <message> is defined in the j.0 namespace as a property with a value of "Question One for Maven".

Next, "<rdf:Description>" includes a description of a resource identified by a "rdf:about" attribute ("urn:communication109"). <j.0:hour> specifies hour as a property within the j.0 namespace having a data type defined in a schema "http://www.w3.org/2001/XMLSchema#long" with a value of 2012021905. <target> is defined in the j.0 namespace as a resource "urn:maven1" in the RDF namespace. <source> is defined in the j.0 namespace as a resource "urn:informationer1" in the RDF namespace. <message> is defined in the j.0 namespace as a property with a value of "Answer for Information for Maven Use".

Next, "<rdf:Description>" includes a description of a resource identified by a "rdf:about" attribute ("urn:communicationl 10"). <j.0:hour> specifies hour as a property within the j.0 namespace having a data type defined in a schema "http://www.w3.org/2001/XMLSchema#long" with a value of 20120222007. <target> is defined in the j.0 namespace as a resource "urn:questioner1" in the RDF namespace. <source> is defined in the j.0 namespace as a resource "urn:maven1" in the RDF namespace. <message> is defined in the j.0 namespace as a property with a value of "Answer or Information for Maven Use".

Next, "<rdf:Description>" includes a description of a resource identified by a "rdf:about" attribute ("urn:communication111"). <j.0:hour> specifies hour as a property within the j.0 namespace having a data type defined in a schema "http://www.w3.org/2001/XMLSchema#long" with a value of 20120222008. <target> is defined in the j.0 namespace as a resource "urn:other1" in the RDF namespace. <source> is defined in the j.0 namespace as a resource "urn:maven1" in the RDF namespace. <message> is defined in the j.0 namespace as a property with a value of "Answer or Information for Maven Use".

Returning to FIG. 6, available characteristics of the information in the light weight data interchange format may be identified (act 606). The available characteristics may be identified as previously described with reference to FIG. 10. The identified available characteristics may then be added to the master actor ontology in the RDF format (act 608).

Next, derived graph characteristics may be determined (act 610). The derived graph characteristics may be centrality, in-degree, out-degree, and connectivity. In some embodiments, betweenness centrality, CB, may be determined. Methods of determining CB are well known to those of ordinary skill in the relevant field(s). CB focuses on a capacity of a node to be an intermediary between any two other nodes.

A directed graph may be represented as $G=V, A$, or $V$(Nodes), $A$(Ordered Edges)

In-degree of a node is a number of edges directed at the node. Out-degree of the node is a number of edges directed away from the node. As an example, with reference to FIG. 13, $V$=(Node 1, Node 2, Node 3) and $A$=set([1, 2), (1, 3), 2, 3)]).

In-degree and out-degree can be calculated by simply counting links.

Node 1=0 in-degree, 2 out-degree

Node 2=1 in-degree, 1 out-degree

Node 3=2 in-degree, 0 out-degree

Connectivity of a graph is an important measure of its robustness as a network. Connectivity relates to a minimum number of elements (nodes or edges) that need to be removed to disconnect remaining nodes from each other.

Returning to FIG. 6, the determined derived graph characteristics may be added to the master actor ontology for each actor (act 612).

Next, user behavior classifications may be determined for actors included in the master actor ontology (act 614) and may be added to the master actor ontology open (act 616).

FIG. 14 illustrates an exemplary table of user behavior classifications based on a system threat type. For each system threat type, the table of user behavior classifications includes a role, a motivation, a potential attack type, and a behavior description of an individual corresponding to a particular role, motivation, threat type, and potential attack type.

An actor's role may be defined in multiple parts:
1. The actor's role within a social structure such as, for example, a social network, based on performing graph analysis;
2. The actor's role within a human psyche such as, for example, one of 16 types of Myers-Briggs indicators; and
3. The actor's role within a trust group (as defined on a case-by-case basis).

The role within the social structure and the role within the human psyche may be determined based on graph analysis and matching of key textual indicators to a Myers-Briggs test. The role within the trust group may depend on a specific type of analysis to be performed. For example, if one desired to detect a malicious insider, then information including, but not limited to, a time and a frequency of message postings as compared to a time and frequency of message postings for normal baseline users as well as use of evasive language may be analyzed.

A number of factors may be considered when determining the role of an actor in a trust group. One factor may be authority within the trust group. It is common to assume that those with more authority are more trustworthy. In the real world, how good someone looks is a second most important variable in trust. The better looking someone is, the more we trust them. In social networks, writing skills and profile neatness may affect trust. Sex may be a factor online. For example, women are considered more trustworthy than men. Citizenship behavior is another factor, mirrored by how one gives back to an online community. One measure of citizenship behavior may be how much one writes online, how many items one has up/down voted, etc. Further, a number of other factors may affect trust.

Certain logic may be applied to a large corpus of data to determine a role of an actor. For example, the data may be queried to determine if the actor was to change his/her view on a particular political item, how will that change propagate throughout a social network, what is a maximal reach of the change, will other actors adopt a same point of view, and how likely is it that the actor will change his/her view? How likely someone is to change his or her point of view is related to psychological indicators.

Some items within an ontology may be dependent on other items being calculated. Further, some items may have a recursive dependency upon themselves. As an example, Shannon's textual entropy can be considered a measurement of a randomness of bits within a string. When text is generated by a computer program it has an entropy within a specific range, while text generated by people from different countries or people who use different languages have their own entropy ranges.

Truly reliable text entropy is measured over time, taking an average of an entropy of individual messages or taking a large corpus of individual messages from a single actor and treating the large corpus as one string in order to determine entropy. In a real time environment, a rolling average entropy may be calculated. Therefore, a value of the entropy may be dynamic.

Shannon's entropy equation is as follows:

$H(X)=-\Sigma_{j=0}^{N-1} p_i \log_2 p_i$, where $H(X)$ is an average minimum number of bits needed to encode a string of symbols based on a frequency of occurrence of the symbols, $p_i$ is a probability of a given symbol, and N is a number of symbols.

After performing act 616, a respective introversion/extroversion indicator may be derived for each of the actors (FIG. 7; act 702) and added to the master actor ontology (act 704). In various embodiments, an introversion/extroversion indicator may be defined based on a continuous scale and determined by, for example, in-degree, out-degree, number of followers, number following the actor, likes, and dislikes, as well as other attributes. Further, a Myers-Briggs Attitude test, which checks polarity of certain statements about oneself and other people, may be taken into consideration when determining the introversion/extroversion indicator.

Statistical errata may be added to the master actor ontology (act 706). The statistical errata may include, but not limited to, a Photo Hash (PHash), message entropy, subjectivity, polarity.

Next, at least one logical expression, representing at least one correlation of interest, may be input (act 708). The at least one logical expression may be made up of components from truth functional operators of propositional and predicate calculus, quantification of predicate calculus, and modal operators of Prior's tense logic. The at least one logical expression may be converted to a standard graph query format (act 710), which may be an RDF query language such as, for example, SPARQL or another RDF query language. In some embodiments, conversion from one or more logical expressions to the RDF query language may be performed directly by converting tensed predicate logic to query logic.

As an example, the following is a logical expression for searching for an actor, who is a connector of subtype prospective liaison:

$$\forall a,b,c \ (\text{Liaison}(a,b,c) \leftrightarrow F(\text{edge}(a,b) \wedge F(\text{edge}(b,c) \wedge F(\text{edge}(c,a)\hat{}H-\text{edge}(c,a))))),$$

where F is interpreted as "it will at some time be the case that", H is interpreted as "it has always been the case that", and ¬ is interpreted as negation. The above logical expression may be directly converted to the RDF query language, SPARQL, as:

```
BASE <http://xmlns.com/foaf/0.1/>
PREFIX: <urn:>
SELECT ?a ?b ?c ?t0 ?t1 ?t2
WHERE {
    [ :source ?a ; :target ?b ; :hour ?t0 ] .
    [ :source ?b ; :target ?c ; :hour ?t1 ] .
    [ :source ?c ; :target ?a ; :hour ?t2 ] .
    FILTER( ?a != ?b && ?b != ?c )
    FILTER( ?t0 < ?t1 && ?t1 < ?t2 )
    FILTER( NOT EXISTS {
    [ :source ?c ; :target ?a ; :hour ?tx ] .
    FILTER( ?tx < ?t0 || ?tx < ?t1 ) })""")
```

As a second example, a logical expression for a Maven is:

$$\forall m(\text{Maven}(m) \leftrightarrow \exists, gF(\text{edge}(i,m, \text{msg}) \wedge F(\text{edge}(g, m) \wedge F(\text{edge}(m,g, \text{msg})))))$$

The above logical expression may be directly converted to the RDF query language, SPARQL, as:

```
BASE http://xmlns.com/foaf/0.1
PREFIX : <urn>
SELECT ?i ?m ?q ?msg0 ?msg1 ?msg2 ?t0 ?t1 ?t2
WHERE {
    [ :source ?i ; :target ?m ; :message ?msg0 ; :hour ?t0 ] .
    [ :source ?q ; :target ?m ; :message ?msg1 ; :hour ?t1 ] .
    [ :source ?m ; :target ?q ; :message ?msg2 ; :hour ?t2 ] .
    FILTER( ?i != ?m && ?q != ?m )
    FILTER( NOT EXISTS {
    [ :source ?q ; :target ?m ; :message ?msg1 ; :hour ?tx ] .
    FILTER( ?tx < ?t0 || ?tx = ?t0 ) } )
    FILTER( NOT EXISTS {
    [ :source ?m ; :target ?q ; :message ?msg2 ; :hour ?tx1 ] .
    FILTER( ?tx1 < ?t1 || ?tx1 = ?t1 ) } )
    FILTER( NOT EXISTS {
    [ :source ?m ; :target ?q ; :message ?msgx ; :hour ?tx1 ] .
    FILTER( ?msgx = ?msg1 && ?msg0 = ?msg2 ) } ) } " " " )
```

Returning to FIG. 7, at least one query in the standard graph query format may be executed to produce at least one query result (act 712). Based on the at least one query result, additional derived values may be determined from the master actor ontology (act 714) and may be stored in the master actor ontology (act 716).

For example, some embodiments may derive DSM-IV codes for the actors. DSM-IV codes are a classification found in the Diagnostic and Statistical Manual of Mental Disorders, 4th Edition. Based on information extracted from a message such as, for example, "today I was smoking pot and totally passed out", DSM-IV 292.89 may be derived. As another example, in some embodiments, psychopathy may be measured for each of the actors by taking the "Hare Psychopathy Checklist" and analyzing message texts for categories including, but not limited to, grandiose (exaggeratedly high) estimation of self
   glib and superficial charm
   pathological lying
   cunning and manipulativeness
   lack of remorse or guilt
   shallow affect (superficial emotional responsiveness)
   callousness and lack of empathy
   parasitic lifestyle
   poor behavioral controls
   sexual promiscuity
   early behavior problems
   lack of realistic long-term goals
   impulsivity
   irresponsibility
   failure to accept responsibility for own actions
   many short-term marital relationships
   juvenile delinquency
   revocation of conditional release
   criminal versatility Storing of Relationships in an Ontology In some cases, data to be stored is about actual direct relationships between actors. This is best shown as an example involving four actors. In this example:

Josh knows Nancy, Darrell, Mike, Rob
   Rob knows Nancy, Darrell, Josh
   Nancy knows Darrell, Mike, Rob, Josh
   Darrell knows Mike, Rob, Nancy, Josh Traditionally, this data would be stored as either a one-dimensional matrix, as shown in FIG. 15, or as a graph. A first row of the one-dimensional matrix of FIG. 15 shows actor Josh and names of other actors that Josh knows. A second row shows actor Rob and names of other actors that Rob knows. A third row shows actor Nancy and names of other actors that Nancy knows. A fourth row shows actor Darrell and names of other actors that Darrell knows. If the data were represented as a graph: G=V,E, the graph would be as follows:

Edge{Josh, Nancy}, Edge{Josh, Darrell}, Edge{Josh, Mike}, Edge{Josh, Rob}
Edge{Rob, Nancy}, Edge{Rob, Darrell}, Edge{Rob, Josh}
Edge{Nancy, Darrell}, Edge{Nancy, Mike}, Edge{Nancy, Rob}, Edge{Nancy, Josh}
Edge{Darrell, Mike}, Edge{Darrell, Rob}, Edge{Darrell, Nancy}, Edge{Darrell, Josh}

Clearly, this approach involves much repetition, which can cause a data capacity problem and slow searches when thousands of these types of entries exist.

If the above-mentioned data is stored multidimensionally, the data would look more like that shown in FIG. 16. That is, in various embodiments, relationships among actors may be stored multidimensionally, thereby, saving storage capacity and not negatively affecting a speed of searches as much as methods discussed in the previous paragraph.

Storing of Derived Data and Data External to the Master Actor Ontology

Because the master actor ontology has a dynamic nature, various embodiments may add placeholders for derived information. After deriving the information, the derived information may be stored in place of the placeholders in the master actor ontology.

If something new is discovered in the master actor ontology, including, but not limited to, a measurement not planned for, a new field not seen before, or a change in a previously static data item, then new data may be stored external to the master actor ontology.

As an example, if previously static information such as, for example, a last name of an actor changes, perhaps due to a marriage, then the changed last name should be stored. However, if the changed last name is stored in the master actor ontology then a mapping of the last name of the actor would be changed, resulting in a need to remap graph connections, matrices, or relationships to the changed last name. Remapping is a time intensive and processing intensive process. Instead, in various embodiments, the changed last name may be stored external to the master actor ontology, but linked to the master actor ontology. RDF has a simple way of handling the above-mentioned situation and JSON has another way of handling the above-mentioned situation. Essentially, various embodiments may handle this situation by indicating that the item "ActorName" now has a sub-item "ActorName". In JSON, a Key: Value combination would appear as:

{ActorName:"old_name"{Actorname:"newname"}}

By handling the situation in this way, a changed value is attached to the ontology, but is not stored in the ontology.

Now, assume something new that hasn't been seen before is discovered in the master actor ontology and a new field is needed. Instead of rebuilding the master actor ontology, a wildcard key may be added. In the RDF, the wildcard key may be added with a key "RDF". As an example, if hair color was discovered and was not planned for, the statement {RDF: {HairColor:"brown"}} may be used. All other linked data set description formats have a wildcard key that may be used. Although this data is not stored in the ontology directly, it is able to be queried. To query HairColor, the statement
SELECT ?RDF:HairColor
may be used, instead of
SELECT ?HairColor
which would work only if HairColor was actually stored in the ontology previously.

Miscellaneous

Embodiments described herein have a number of advantages not found in existing ontologies.
1. Inputting of logical expressions representing queries makes the ontology storage agnostic. That is, researchers are no longer required to express queries in a format that is specific to a storage system.
2. New categories can be defined as output of a query, thereby making the ontology dynamic.
3. The ontology includes items that we believe have not been included in any open or closed research ontologies.
4. The ontology includes placeholders for information derived solely from data of the ontology such as, for example, personality types or other data that must first be discovered by understanding given actor information.
5. The ontology considers psychological or sociological factors as primary descriptors and is augmented with graph information. Existing social network ontologies have focused on graph placement.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A machine-implemented method for analyzing a plurality of online social networks, the method comprising:
   receiving information about the plurality of online social networks, the information including messages, user identifiers, and relationship data regarding a plurality of actors of the plurality of online social networks;
   analyzing the received information, the analyzing further comprising:
      identifying available characteristics as defined by a plurality of online social network schemas,
      adding the identified available characteristics to a master actor ontology,
      determining a plurality of derived graph characteristics,
      adding the plurality of derived graph characteristics to the master actor ontology,
      determining a plurality of user behavior classifications,
      adding the plurality of user behavior classifications to the master actor ontology,
      determining a derived introversion/extroversion indicator for the plurality of actors based on a respective actor's attributes included in the master actor ontology, and
      adding the derived introversion/extroversion indicator to the master actor ontology;
   the method further comprising:
   inputting at least one logical expression representing at least one correlation of interest with respect to the master actor ontology;
   converting the at least one logical expression into at least one query in a standard graph query format;
   executing the at least one query over the master actor ontology to produce at least one query result;
   after executing the at least one query, determining additional derived values from the master actor ontology based, at least in part, on the at least one query result; and
   storing the additional derived values from the master actor ontology, wherein
   the method is performed by a plurality of processing devices, each of the plurality of processing devices performing processing on a respective portion of the master actor ontology.

2. The machine-implemented method of claim 1, wherein the information in the receiving act is in a JavaScript Object Notation format.

3. The machine-implemented method of claim 1, wherein the master actor ontology is stored in a resource description framework format.

4. The machine-implemented method of claim 1, wherein the analyzing the received information further comprises, at least in part, performing a plurality of resource description framework queries and performing standard graph analysis.

5. The machine-implemented method of claim 1, wherein the at least one logical expression comprises a plurality of components from truth functional operators of propositional and predicate calculus, quantification of the predicate calculus, and modal operators of Prior's tense logic.

6. The machine-implemented method of claim 1, wherein the determining a plurality of derived graph characteristics further comprises:
adding placeholders to the master actor ontology for the plurality of derived graph characteristics,
deriving values for the plurality of derived graph characteristics through graph recursion, and
after deriving the values, storing the derived values in place of the corresponding placeholders.

7. The machine-implemented method of claim 1, wherein the derived graph characteristics comprise connectivity, centrality, in-degree, and out-degree.

8. The machine-implemented method of claim 1, wherein the derived introversion/extroversion indicator is defined based on a continuous scale.

9. The machine-implemented method of claim 1, wherein the analyzing further comprises:
adding derived sociological and psychological characteristics to the master actor ontology.

10. The machine-implemented method of claim 9, wherein the derived sociological and psychological characteristics comprise a plurality of Myers-Briggs indicators.

11. The machine-implemented method of claim 1, further comprising adding statistical errata to the mater actor ontology, the statistical errata further comprising at least one item from a list of items consisting of a photo hash, a message entropy, a subjectivity, and a polarity.

12. A plurality of processing devices for analyzing a plurality of online social networks, each of the plurality of processing devices comprising:
at least one processing unit;
a memory;
a communication unit for communicating with at least one other processing device of the plurality of processing devices; and
a communication bus for permitting the at least one processing unit to communicate with the memory and the communication unit, wherein:
the memory of each of the plurality of processing devices comprises a plurality of instructions, which when executed by each of the at least one processing unit causes the plurality of processing devices to collectively perform a method comprising:
constructing a master actor ontology based on information received from the plurality of online social networks, the constructed master actor ontology including available characteristics identified from the received information, a plurality of derived graph characteristics, a plurality of user behavior classifications, and an introversion/extroversion indicator based on a respective actor's attributes for each of a plurality of actors;
inputting at least one logical expression representing at least one correlation of interest with respect to a graph or a subgraph of the master actor ontology;
automatically converting the at least one logical expression to a resource description framework query format;
performing at least one query over the master actor ontology, based on the converted at least one logical expression, to provide at least one query result of the performed at least one query;
after performing the at least one query, determining additional derived values from the master actor ontology based, at least in part, on the at least one query result; and
storing the additional derived values from the master actor ontology.

13. The plurality of processing devices of claim 12, wherein the constructing a master actor ontology further comprises:
automatically converting the received information from a JavaScript Object Notation format to a resource description framework format.

14. The plurality of processing devices of claim 12, wherein the master actor ontology is stored in a resource description framework format.

15. The plurality of processing devices of claim 12, wherein the constructing a master actor ontology further comprises:
identifying available characteristics of the plurality of online social networks based on the received information;
adding the identified available characteristics to the master actor ontology;
determining a plurality of derived graph characteristics;
adding the plurality of derived graph characteristics to the master actor ontology;
adding a plurality of user behavior characteristics to the master actor ontology;
determining a derived introversion/extroversion indicator for each actor of the plurality of actors whose information is included in the master actor ontology; and
adding the respective derived introversion/extroversion indicator for the each of the plurality of actors whose information is included in the master actor ontology.

16. The plurality of processing devices of claim 15, wherein:
the plurality of user behavior classifications comprise a role of an actor of the master actor ontology, and
the constructing the master actor ontology further comprises:
determining a respective role of at least some of the plurality of actors based on performing a graph analysis;
performing text analysis to determine a respective personality type of the at least some of the plurality of actors; and
determining a respective role within a trust group for the at least some of the plurality of actors.

17. The plurality of processing devices of claim 15, wherein the automatically converting the at least one logical expression to a resource description framework query format further comprises:
automatically converting the at least one logical expression to a SPARQL query language.

18. The plurality of processing devices of claim 15, wherein the plurality of derived graph characteristics comprise connectivity, centrality, in-degree, and out-degree.

19. The plurality of processing devices of claim 12, wherein the constructing the master actor ontology further comprises:
performing a plurality of resource description framework queries; and
performing standard graph analysis.

20. The plurality of processing devices of claim 12, wherein the constructing the master actor ontology further comprises:

adding derived sociological and psychological characteristics to the master actor ontology, the derived sociological and psychological characteristics further comprising a plurality of Myers-Briggs indicators.

21. The plurality of processing devices of claim 20, wherein the adding derived sociological and psychological characteristics to the master actor ontology further comprises:

adding placeholders to the master actor ontology for the derived sociological and psychological characteristics;

deriving the sociological and psychological characteristics based, at least partially, on performing graph recursion with respect to the master actor ontology; and replacing the added placeholders with the derived sociological and psychological characteristics.

22. At least one non-transient machine-readable medium having instructions stored therein such that, when the instructions are executed by at least one processor of at least one processing device, a method is performed, the method comprising:

constructing a master actor ontology in a resource description framework format based on information received from a plurality of online social networks, the constructed master actor ontology including available characteristics identified from the received information, a plurality of derived graph characteristics, a plurality of user behavior classifications, and an introversion/extroversion indicator based on a respective actor's attributes for each of a plurality of actors;

inputting at least one logical expression representing at least one correlation of interest with respect to a graph or a subgraph of the master actor ontology;

automatically converting the at least one logical expression to a resource description framework query format;

performing at least one query over the master actor ontology, based on the converted at least one logical expression, to provide at least one query result of the performed at least one query;

after performing the at least one query, determining additional derived values from the master actor ontology based, at least in part, on the at least one query result; and storing the additional derived values from the master actor ontology.

23. The at least one non-transient machine-readable medium of claim 22, wherein the at least one logical expression comprises a plurality of components from truth functional operators of propositional and predicate calculus, quantification of the predicate calculus, and modal operators of Prior's tense logic.

24. The machine-implemented method of claim 1, wherein the respective actor's attributes are one or more of an in-degree, an out-degree, a number of followers, a number following the actor, likes, or dislikes.

* * * * *